United States Patent
Vujcic

(10) Patent No.: US 8,054,791 B2
(45) Date of Patent: Nov. 8, 2011

(54) METHOD AND PROCEDURES FOR UNSYNCHRONIZED, SYNCHRONIZED, AND SYNCHRONIZATION STAND BY COMMUNICATIONS IN E-UTRA SYSTEMS

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 12/158,933

(22) PCT Filed: Nov. 20, 2006

(86) PCT No.: PCT/KR2006/004881
§ 371 (c)(1),
(2), (4) Date: Jun. 23, 2008

(87) PCT Pub. No.: WO2007/073040
PCT Pub. Date: Jun. 28, 2007

(65) Prior Publication Data
US 2009/0252125 A1  Oct. 8, 2009

(51) Int. Cl.
*H04W 4/00* (2009.01)
(52) U.S. Cl. ..... 370/329; 370/337; 455/434; 455/435.1; 398/53
(58) Field of Classification Search .................. None
See application file for complete search history.

(56) References Cited

U.S. PATENT DOCUMENTS

| | | | |
|---|---|---|---|
| 5,490,114 | A | 2/1996 | Butler et al. |
| 5,970,062 | A | 10/1999 | Bauchot |
| 6,404,753 | B1 | 6/2002 | Chien et al. |
| 6,452,940 | B1 * | 9/2002 | Yared et al. ............ 370/465 |
| 6,574,212 | B1 * | 6/2003 | Jurgensen et al. ........ 370/348 |
| 6,574,421 | B2 | 6/2003 | Tsumagari et al. |
| 6,717,975 | B2 | 4/2004 | Kanterakis et al. |
| 6,987,979 | B2 * | 1/2006 | Carlsson ............ 455/456.6 |
| 2007/0206531 | A1 * | 9/2007 | Pajukoski et al. ......... 370/329 |
| 2010/0238872 | A1 * | 9/2010 | Kim et al. ............... 370/329 |
| 2010/0246499 | A1 * | 9/2010 | Kim et al. ............... 370/329 |

FOREIGN PATENT DOCUMENTS

| | | |
|---|---|---|
| CN | 1276957 | 12/2000 |
| CN | 1533055 | 9/2004 |
| EP | 1037481 A1 | 9/2008 |
| GB | 2301752 | 12/1996 |
| JP | 2000151494 | 5/2000 |
| JP | 2000175271 | 6/2000 |
| JP | 2000299678 | 10/2000 |
| JP | 2001189683 | 7/2001 |
| JP | 2001521349 | 11/2001 |
| JP | 2003134080 | 5/2003 |
| JP | 2003229804 | 8/2003 |
| JP | 2003258679 | 9/2003 |
| JP | 2004266854 | 9/2004 |
| JP | 2004282653 | 10/2004 |
| JP | 2005064567 | 3/2005 |

* cited by examiner

*Primary Examiner* — Chi Pham
*Assistant Examiner* — David S Andreasen
(74) *Attorney, Agent, or Firm* — Lee, Hong, Degerman, Kang & Waimey

(57) ABSTRACT

An improved method of processing random access procedures, wherein the network receives at least one access burst to allow a network to estimate uplink received timing, the access burst containing at least a preamble, and transmits information for responding to the at least one access burst, while the mobile terminal configures at least one access burst containing at least a preamble and transmits the at least one access burst to allow a network to at least estimate uplink received timing.

18 Claims, 7 Drawing Sheets

[Fig. 1]
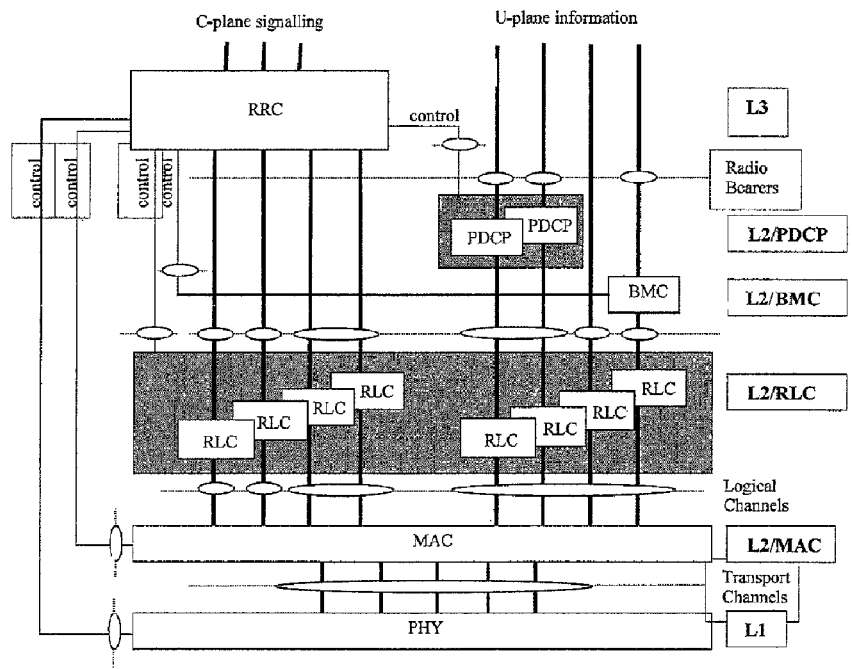
[Fig. 2]
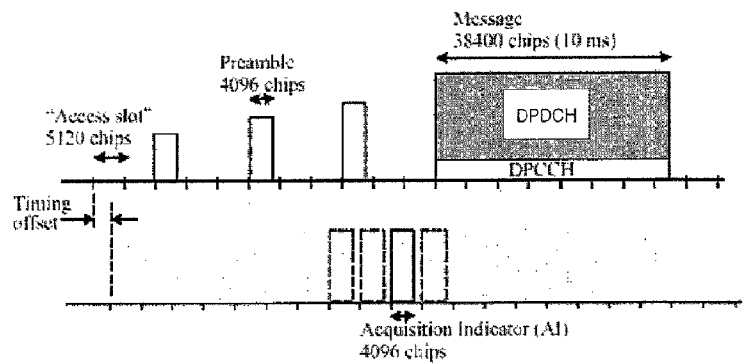
[Fig. 3]
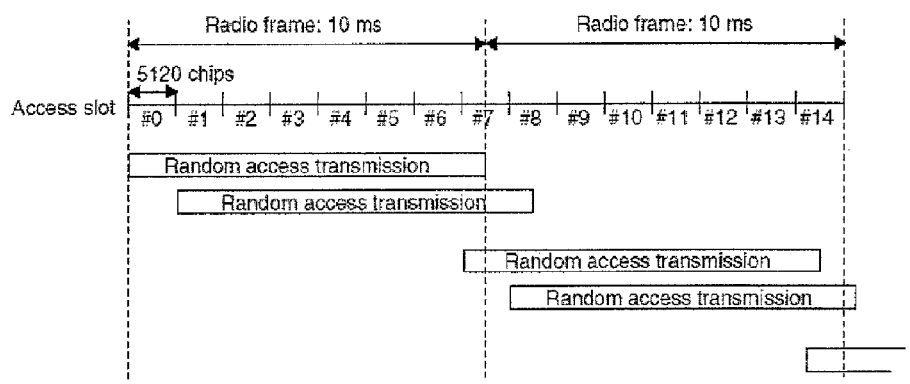

[Fig. 4]
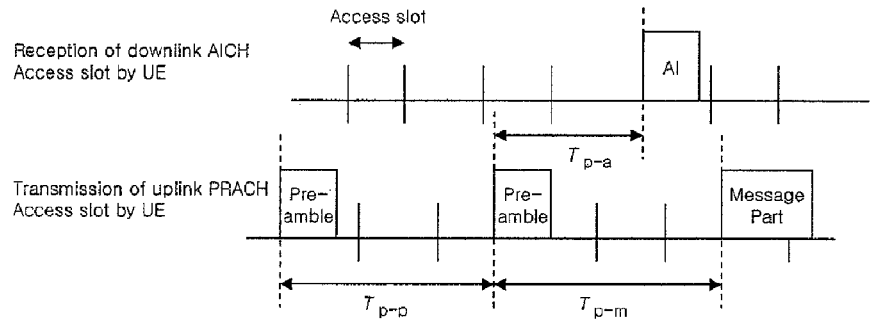
[Fig. 5]
| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |
[Fig. 6]
| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

[Fig. 7]
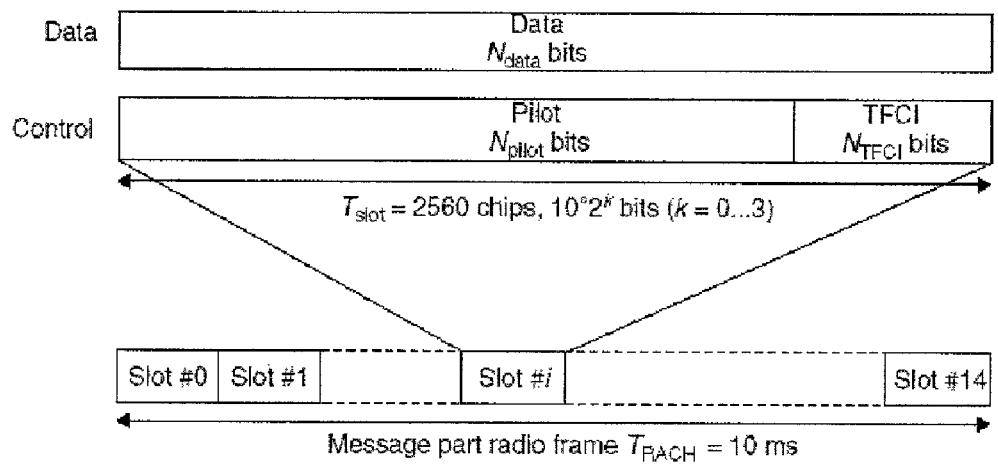
[Fig. 8]
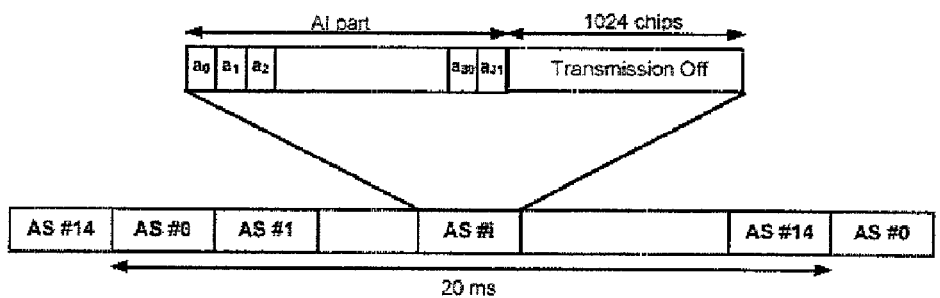
Figure 84: Structure of the AICH
[Fig. 9]
| AC | 0 - 9 | 10 | 11 | 12 | 13 | 14 | 15 |
|---|---|---|---|---|---|---|---|
| ASC | 1st IE | 2nd IE | 3rd IE | 4th IE | 5th IE | 6th IE | 7th IE |

[Fig. 10]
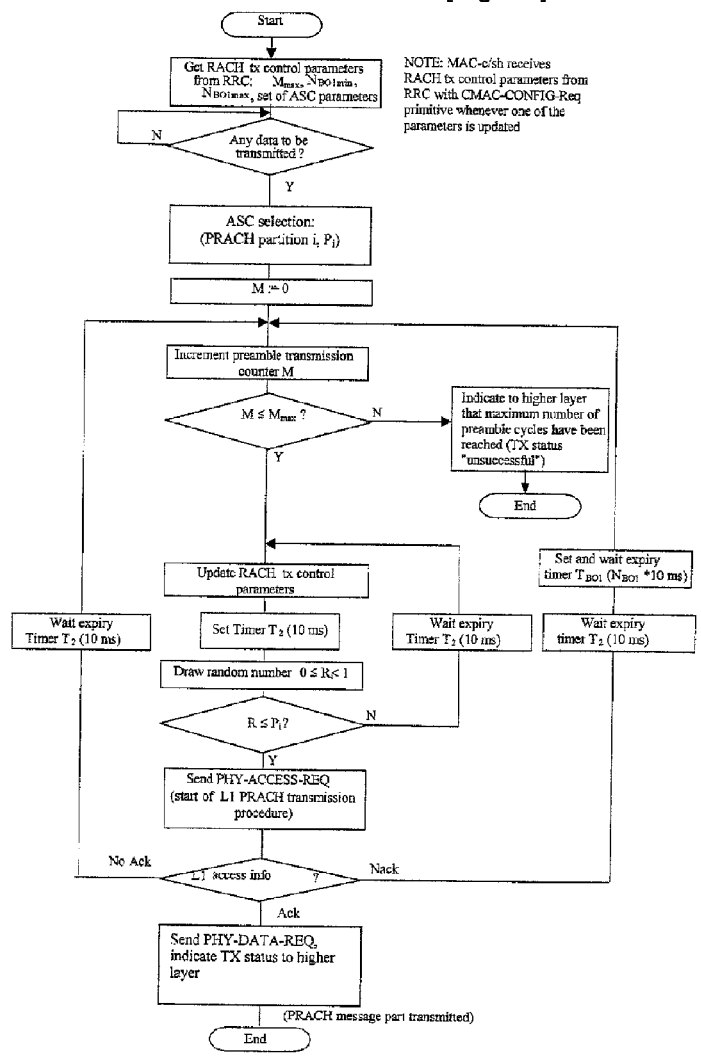
[Fig. 11]
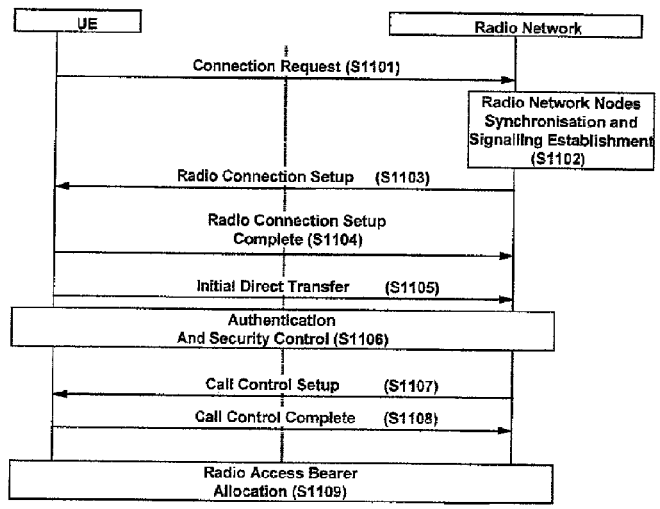

[Fig. 12]
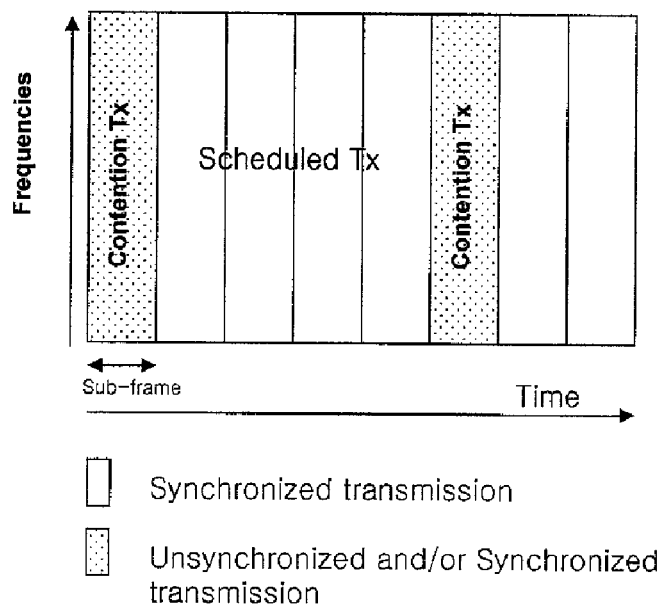
[Fig. 13]
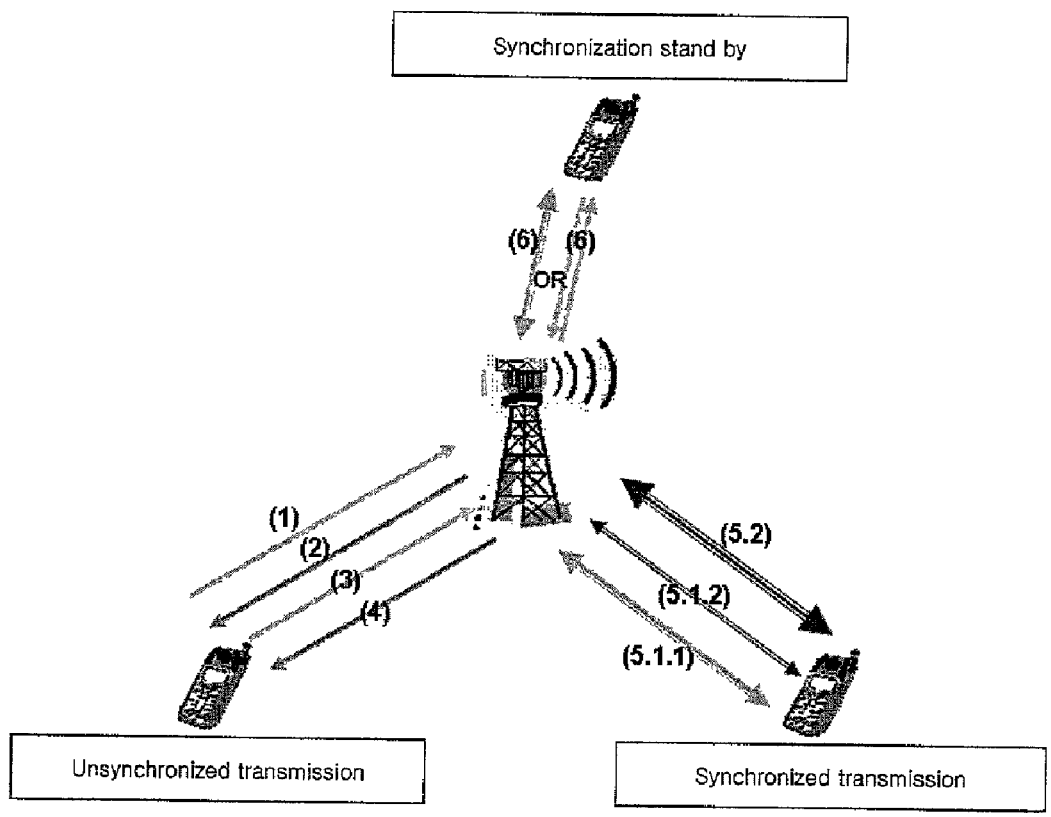

[Fig. 14]
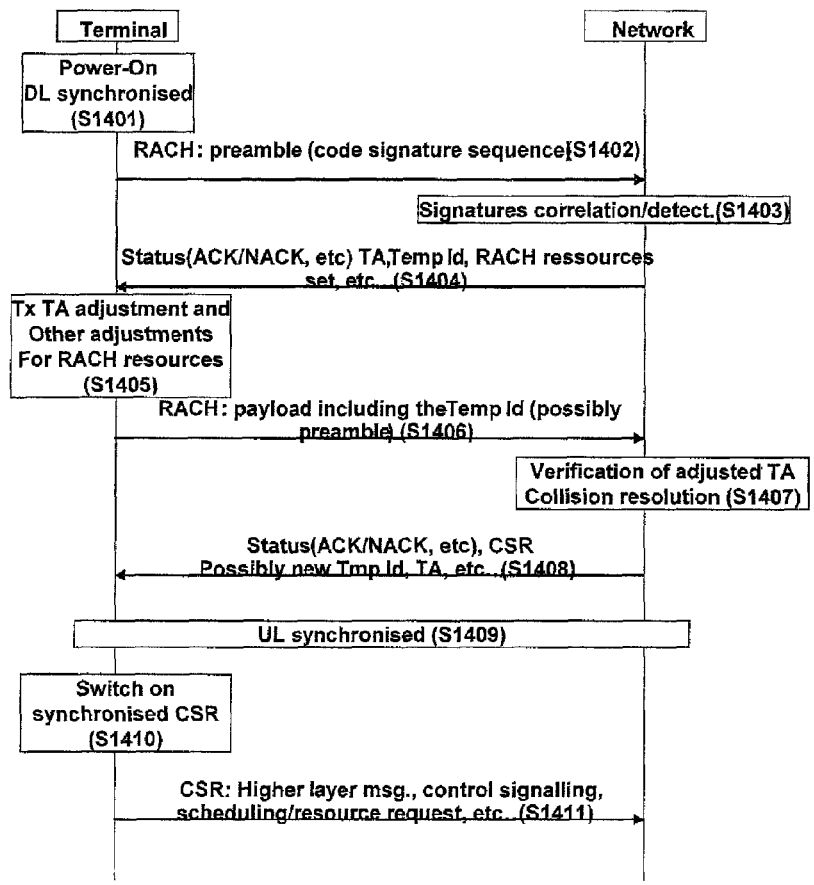
[Fig. 15]
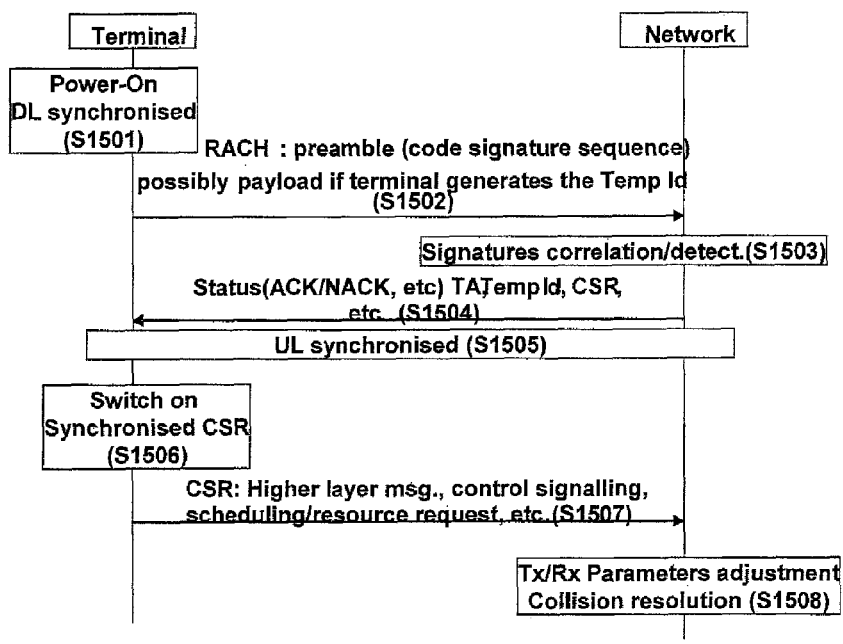

[Fig. 16]
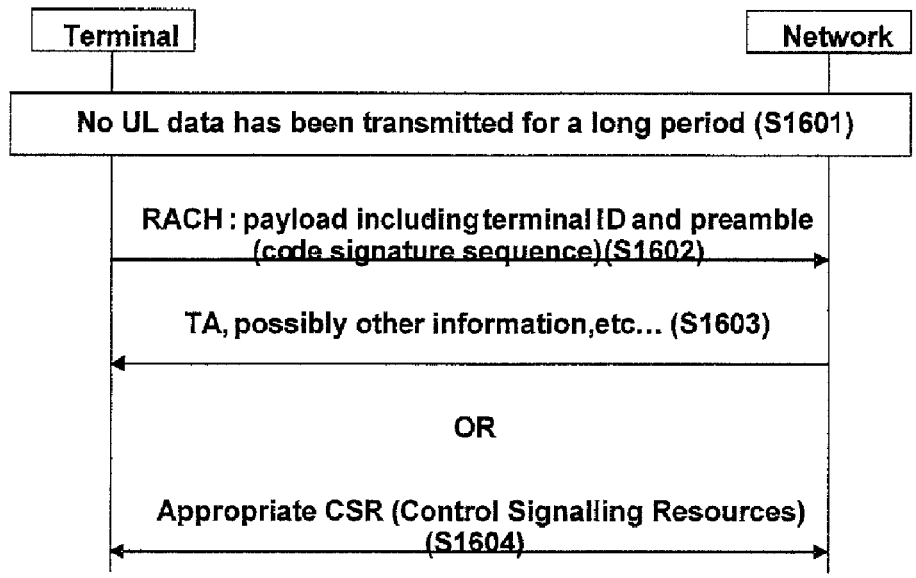
[Fig. 17]
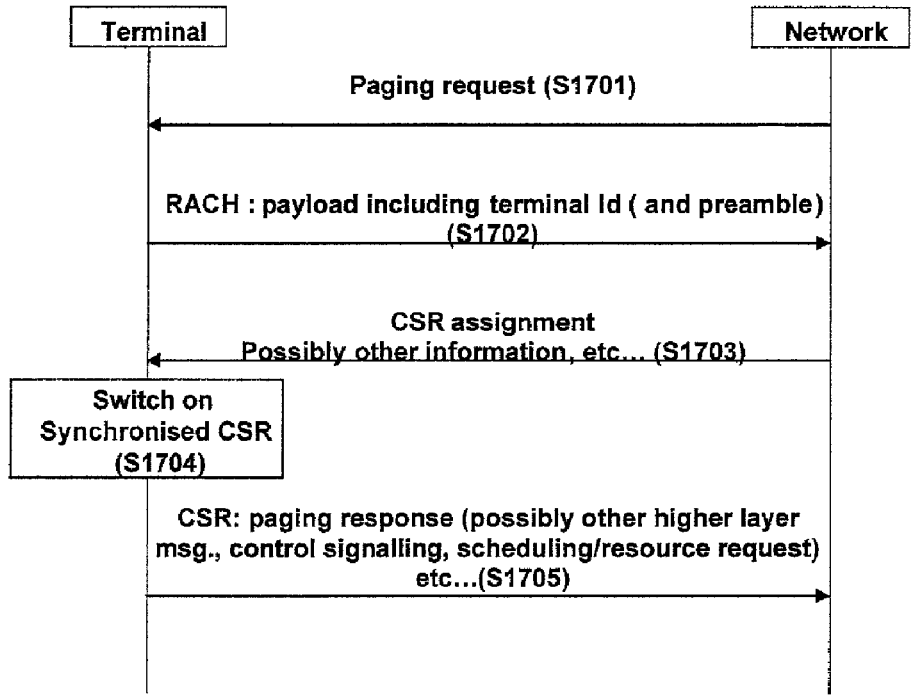

METHOD AND PROCEDURES FOR UNSYNCHRONIZED, SYNCHRONIZED, AND SYNCHRONIZATION STAND BY COMMUNICATIONS IN E-UTRA SYSTEMS

TECHNICAL FIELD

The present disclosure relates to radio communications, and in particular, relates to a method and procedures for unsynchronized, synchronized and synchronization stand-by communications in Evolved UTRA (Evolved UMTS Terrestrial Radio Access) systems.

BACKGROUND ART

A radio (wireless) communication system may be comprised of an access network and a plurality of access terminals. The access network may include access points, such as Node Bs, base stations, or the like, that allow the access terminals to connect with the access network for uplink (UL: terminal-to-network) communications and downlink (DL: network-to-terminal) communications via various types of channels. The access terminals may be user equipment (UE), mobile stations, or the like.

Although the concepts described hereafter may be applicable to different types of communication systems, the Universal Mobile Telecommunications System (UMTS) will be described merely for exemplary purposes. A typical UMTS has at least one core network (CN) connected with at least one UTRAN (UMTS Terrestrial Radio Access Network) that has Node Bs acting as access points for multiple UEs.

FIG. 1 shows the radio interface protocol architecture according to the 3GPP radio access network standards. The radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 1 can be divided into a first layer (L1), a second layer (L2), and a third layer (L3) based on the three lower layers of an open system interconnection (OSI) standard model. The first layer (L1), namely, the physical layer (PHY), provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted.

The MAC layer is connected to the physical layer by transport channels and can be divided into a MAC-b sub-layer, a MAC-d sub-layer, a MAC-c/sh sub-layer, a MAC-hs sub-layer and a MAC-m sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink, the Random Access Channel (RACH). The MAC-m sub-layer may handle the MBMS data. The MAC-d sub-layer manages a dedicated channel (DCH), which is a dedicated transport channel for a specific terminal. The MAC-d sub-layer is located in a serving RNC (SRNC) that manages a corresponding terminal and one MAC-d sub-layer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

The E-UTRA (Evolved UMTS Terrestrial Radio Access) system, also called a LTE (Long Term Evolution) system, is considered as involving the PS (Packet Switched) domain with only shared resources to be used. In this new context with faster delay and higher capacity requirements, the usage of LTE RACH (LTE Random Access Channel) should be somewhat different to the existing GSM and UMTS systems in order to meet access requirement specified for LTE.

The present disclosure proposes RACH use cases for LTE. Mainly, the LTE RACH is considered, as contention based uplink transmission, and may no longer be used to carry user data, control signaling or explicit request resources. Such may be used to indicate presence (when the terminal is unknown by the covered area) and to obtain and/or possibly to obtain/maintain uplink timing synchronization (at power on or after a certain period of inactivity) with collision resolution. The remaining information that was carried by the RACH in the related art, are carried by data non-associated control signaling resources (CSR) considered as shared uplink resources used by all terminals with uplink synchronized transmission which are either contention or scheduled based. The CSR can be also used instead of the LTE RACH to maintain uplink synchronization.

The procedure where the terminal (or UE: User Equipment) sends a first message to the network is referred to as initial access. For this procedure, the common uplink channel called RACH (Random Access Channel) is used. In all cases (GSM and UMTS systems), the initial access may start from the UE with a connection request message including the reason of the request, and an answer (or response) from the network indicating the allocation of radio resources for the requested reason.

There are several reasons, each called an establishment cause, for sending a connection request message and the following list shows some examples specified in UMTS (see 3GPP TS 25.331):

Originating Conversational Call,
Originating Streaming Call,
Originating Interactive Call,
Originating Background Call,
Originating Subscribed traffic Call,
Terminating Conversational Call,
Terminating Streaming Call,
Terminating Interactive Call,
Terminating Background Call,
Emergency Call,
Inter-RAT cell re-selection,
Inter-RAT cell change order,
Registration, Detach,
Originating High Priority Signalling,
Originating Low Priority Signalling,
Call re-establishment,
Terminating High Priority Signalling,
Terminating Low Priority Signalling.

Here, the originating call reason indicates that the UE wants to setup a connection, for instance, a speech (voice) connection. The terminating call reason indicates that UE answers to paging. The registration reason indicates that the user wants to register only to location update.

To send information over the air (or wireless) interface, the physical random access procedure is used. The physical random access transmission is under the control of a higher layer protocol, which performs some important functions related to priority and load control. These procedures differ between GSM and UMTS radio systems. The description of GSM random access procedure can be found in *The GSM System for Mobile Communications*, published by M. Mouly and M. B. Pautet, 1992. As the present disclosure is UMTS enhancement/evolution related, the W-CDMA random access procedure will be described in more detail as follows.

The transport channel called RACH and two physical channels called PRACH and AICH are involved in this procedure. Transport channels are the channels supplied from the physical layer to the MAC (Medium Access Control) protocol layer. There are several types of transport channels to transmit data with different properties and transmission formats over the physical layer. Physical channels are identified by code and frequency in FDD mode. They are normally based on a layer configuration of radio frames and timeslots. The format of radio frames and timeslots depends on the symbol rate of the physical channel. A radio frame is the minimum unit in the decoding process, consisting of 15 time slots. A time slot is the minimum unit in the Layer 1 bit sequence. Thus, the number of bits that can be accommodated in one time slot depends on the physical channel. The transport channel RACH (Random Access Channel) is an uplink common channel used for transmitting control information and user data. It is applied in random access, and used for low-rate data transmissions from the higher layer. The RACH is mapped to the uplink physical channel, called a PRACH (Physical Random Access Channel). The AICH (Acquisition Indication Channel) is a downlink common channel, which exists as a pair with the PRACH used for random access control.

The transmission of PRACH is based on a slotted ALOHA approach with fast acquisition indication. The UE may randomly select an access resource and transmits a RACH preamble part of a random access procedure to the network. The preamble is a short signal that is sent before the transmission of the RACH connection request message. The UE repeatedly transmits the preamble by increasing its transmission power every time the preamble is sent until it receives an Acquisition Indicator (AI) on the AICH (Acquisition Indicator Channel), which indicates the detection of the preamble by the network. The UE stops the transmission of the preamble once it receives the AI, and sends the message part at the level of power equal to the preamble transmission power at that point, plus an offset signalled by the network. This random access procedure avoids a power ramping procedure for the entire message. Such ramping procedure would create more interference due to unsuccessfully sent messages and it would be less efficient due to the larger delay, since it would take much more time to decode the message before an acknowledgement could be given that it was received successful.

The main characteristics of the RACH is that it is a contention based channel, which means that due to simultaneous access of several users, collisions may occur such that the initial access message cannot be decoded by the network. The UE can start the random-access transmission (both preamble and message) at the beginning of an access slot only. This kind of access method is therefore a type of slotted ALOHA approach with fast acquisition indication.

FIG. 2 shows an example of access slots in relation to the transmission of a preamble, a message, and an acquisition indicator (AI).

FIG. 3 shows an example of the number of RACH access slots and their spacing.

Referring to FIGS. 2 and 3, the time axis of both the RACH and the AICH is divided into time intervals, called access slots. There are 15 access slots per two frames (one frame is 10 ms in length or 38400 chips) and they are spaced 1.33 ms (5120 chips) apart.

FIG. 4 shows an example of the reception of downlink AICH access slot by the UE and the transmission of uplink PRACH access slot by the UE. Namely, FIG. 4 shows the transmission timing relationship between the PRACH and AICH.

FIG. 5 shows a table with the available uplink access slots for different RACH sub-channels.

Referring to FIGS. 4 and 5, the information on what access slots are available for random-access transmission and what timing offsets to use between RACH and AICH, between two successive preambles and between the last preamble and the message is signalled by the network. For example, if the AICH transmission timing is 0 or 1, it will be sent 3 or 4 access slots after the last preamble access slot transmitted, respectively.

Also, referring to FIGS. 4 and 5, the timing at which the UE can send the preamble is divided by random access sub-channels. A random access sub-channel is a subset comprising the combination of all uplink access slots. There are 12 random access sub-channels in total. Random access sub-channel consists of access slots.

FIG. 6 shows an exemplary format of preamble signatures. The preamble is a short signal that is sent before the transmission of the RACH message. A preamble consists of 4096 chips, which is a sequence of 256 repetitions of Hadamard codes of length 16 and scrambling codes assigned from the upper layer. The Hadamard codes are referred to as signature of the preamble. There are 16 different signatures and a signature is randomly selected (from available signatures sets on the basis of ASC) and repeated 256 time for each transmission of preamble part.

FIG. 7 shows an exemplary structure of a random access message part. The message part is spread by short codes of OVSF codes that are uniquely defined by the preamble signature and the spreading codes as the ones used for the preamble signature. The message part radio frame of length 10 ms is divided into 15 slots, each consisting of 2560 chips. Each slot consists of a data part and a control part that transmits control information (pilot bits and TFCI). The data part and the control part are transmitted in parallel. The 20-ms-long message part consists of two consecutive message part radio frames. The data part consists of 10*2k bits (k=0, 1, 2, 3), which corresponds to the Spreading Factor (SF=256, 128, 64, 32).

FIG. 8 shows an exemplary format (structure) of the AICH. The AICH consists of a repeated sequence of 15 consecutive access slots, each of length 40 bit intervals (5120 chips). Each access slot consists of two parts, an Acquisition Indicator (AI) part consisting of 32 real-valued signals a0, . . . , a31 and a part of duration 1024 chips where transmission is switched off.

When the network detects transmission of an RACH preamble in an RACH access slot with a certain signature, it repeats this signature in the associated AICH access slot. This means that the Hadamard code used as signature on RACH preamble is modulated onto the AI part of the AICH. The acquisition indicator corresponding to signature can take the values +1, −1, and 0, depending on whether a positive acknowledgement a negative acknowledgement or no acknowledgement is given to a specific signature. The positive polarity of signature indicates that the preamble has been acquired and the message can be sent. The negative polarity indicates that the preamble has been acquired and the power ramping procedure shall be stopped, but the message shall not be sent. This negative acknowledgement is used when, due to a congestion situation in the network, a transmitted message cannot not be processed at the present time. In this case, the access attempt needs to be repeated some time later by the UE.

Regarding the random access procedure on protocol layer (L2), the network decides whether the mobile station is to be permitted use of a radio access resource based primarily upon the access class to which the UE belongs. A specified priority level is implied by the Access Class (AC) which is stored on the UE SIM card.

Hereafter, certain aspects of access control will be described. It should be noted that the relevant standard related to this matter is 3GPP TS 22.011.

Regarding the purpose of access control, under certain circumstances, it will be desirable to prevent UE users from making access attempts (including emergency call attempts) or responding to pages in specified areas of a PLMN (Public Land Mobile Network). Such situations may arise during states of emergency, or where 1 of 2 or more co-located PLMNs has failed. Broadcast messages should be available on a cell-by-cell basis indicating the class(es) of subscribers barred from network access. The use of this facility allows the network operator to prevent overload of the access channel under critical conditions. It is not intended that access control be used under normal operating conditions.

For allocation, all UEs are members of one out of ten randomly allocated mobile populations, defined as Access Classes 0 to 9. The population number can be stored in a SIM/USIM for the UE. In addition, mobiles may be members of one or more out of 5 special categories (Access Classes 11 to 15), which also may be stored in the SIM/USIM. These may be allocated to specific high priority users as follows. (This enumeration is not meant as a priority sequence):

Class 15—PLMN Staff;
Class 14—Emergency Services;
Class 13—Public Utilities (e.g. water/gas suppliers);
Class 12—Security Services;
Class 11—For PLMN Use.

For operation, if the UE is a member of at least one Access Class which corresponds to the permitted classes as signalled over the air interface, and the Access Class is applicable in the serving network, access attempts are allowed. Otherwise access attempts are not allowed.

Access Classes are applicable as follows:
Classes 0~9—Home and Visited PLMNs;
Classes 11 and 15—Home PLMN only;
Classes 12, 13, 14—Home PLMN and visited PLMNs of home country only.

Any number of these classes may be barred at any one time.

For emergency calls, an additional control bit known as Access Class 10 is also signalled over the air interface to the UE. This indicates whether or not network access for Emergency Calls is allowed for UEs with access classes 0 to 9 or without an IMSI. For UEs with access classes 11 to 15, Emergency Calls are not allowed if both Access Class 10 and the relevant Access Class (11 to 15) are barred. Otherwise, Emergency Calls may be allowed.

Hereafter, the mapping of Access Classes (AC) will be described. It should be noted that the relevant standard related to this matter is 3GPP TS 25.331.

In UMTS, the Access Classes are mapped to Access Service Classes (ASC). There are eight different priority levels defined (ASC 0 to ASC 7), with level 0 being the highest priority.

For mapping of Access Classes to Access Service Classes, the Access Classes shall only be applied at initial access, i.e. when sending an RRC CONNECTION REQUEST message. A mapping between Access Class (AC) and Access Service Class (ASC) shall be indicated by the information element AC-to-ASC mapping in System Information Block type 5. The correspondence between AC and ASC is indicated in FIG. 9.

FIG. 9 shows a table showing the correspondence between AC and ASC. The $n^{th}$ IE designates an ASC number i in the range 0-7 to AC. If the ASC indicated by the $n^{th}$ IE is undefined, the UE behaviour is unspecified.

For random access, the parameters implied by the respective ASC shall be employed. In case the UE is a member of several ACs, it shall select the ASC for the highest AC number. In connected mode, AC shall not be applied.

An ASC consists of a subset of RACH preamble signatures and access slots which are allowed to be used for this access attempt and a persistence value corresponding to a probability $Pv \leq 1$ to attempt a transmission. Another important mechanism to control random access transmission is load control mechanism which allows reducing of the load of incoming traffic when the collision probability is high or when the radio resources are low.

The present disclosure provides an improved method of processing random access procedures, wherein the network receives at least one access burst to allow a network to estimate uplink received timing, the access burst containing at least a preamble, and transmits information for responding to the at least one access burst. On the other hand, the mobile terminal configures at least one access burst containing at least a preamble and transmits the at least one access burst to allow a network to at least estimate uplink received timing. The features of the present disclosure may be applied to various use cases such as synchronization with (or without) collision resolution, synchronization in absence of user data, response to network request (paging), and the like to thus support unsynchronized, synchronized and synchronization stand-by communications.

DISCLOSURE OF INVENTION

Technical Problem

The present disclosure addresses the following problem of the related art. The EUTRA requirement specification (e.g., TR 25.913) includes shortest delay highest capacity and faster access requirements when compared to existing systems like GSM and UMTS. In those systems (GSM and UMTS), RACH is designed to carry two parts: one is the preamble parts used for access request and the second is the payload message part used for: resource request, control signaling and a user data transfers. The payload part can require several retransmissions when the terminal is in a poor coverage area, increasing thus the access delay and decreasing the access capacity due to RACH resources occupancy.

Technical Solution

The present disclosure solves the problem by considering the RACH as shared uplink resource contention based transmission, carrying-out preamble part and/or possibly small as possible the payload part including only a terminal (temporal) identity. The remaining payload/message part is transmitted using shared uplink resources either on contention based or on scheduled based transmission that does not differ from other normal uplink shared resources used by all terminals with uplink synchronized transmissions. The synchronized uplink resources can be controlled by the network, responsible for rapidly allocating appropriate resources in order to maintain the given level of performances.

BRIEF DESCRIPTION OF THE DRAWINGS

FIG. 1 shows the radio interface protocol architecture according to the 3GPP radio access network standards.

FIG. 2 shows an example of access slots in relation to the transmission of a preamble, a message, and an acquisition indicator (AI).

FIG. 3 shows an example of the number of RACH access slots and their spacing.

FIG. 4 shows an example of reception of DL AICH and UL PRACH by a UE.

FIG. 5 shows a table with the available uplink access slots for different RACH sub-channels.

FIG. 6 shows an exemplary format of preamble signatures.

FIG. 7 shows an exemplary structure of a random access message part.

FIG. 8 shows an exemplary format (structure) of the AICH.

FIG. 9 shows a table showing the correspondence between AC and ASC.

FIG. 10 shows a flow chart of an exemplary control access procedure.

FIG. 11 shows an exemplary signal flow for Signalling Establishment.

FIG. 12 shows an example of how transmissions may be scheduled with respect to the frequency domain and time domain.

FIG. 13 shows an exemplary LTE RACH general proposed procedure.

FIG. 14 shows an exemplary LTE RACH USE CASE 1 (Synchronization with Collision resolution).

FIG. 15 shows an exemplary LTE RACH USE CASE 2 (Synchronization without collision resolution).

FIG. 16 shows an exemplary LTE RACH USE CASE 3 (Synchronization in absence of user data).

FIG. 17 shows an exemplary LTE RACH USE CASE 4 (Response to Network Request).

MODE FOR THE INVENTION

One aspect of the present disclosure is the recognition by the present inventor regarding the problems and drawbacks of the related art described above. Based upon such recognition, the features of the present disclosure have been developed.

Although the following description will refer to optimized RACH procedures of UMTS merely for the sake of explanation, the features of the present disclosure are clearly intended to be applicable to various other types of communication methods and systems that would benefit from employing the particular features of the present disclosure.

FIG. 10 shows a flow chart of an exemplary control access procedure. It should be noted that the relevant standard related to this matter is 3GPP TS 25.321.

The control access procedure may be performed in the following five steps:

(1) Existing specifications provide many RACH transmission control parameters which are stored and updated by the UE based on system information broadcasted by the network. The RACH transmission control parameters include Physical RACH (PRACH), Access Service Class (ASC), maximum number of preamble ramping cycles Mmax, range of backoff interval for timer TBO1, given in terms of numbers of transmission 10 ms time intervals NBO1max and NBO1min, applicable when negative acknowledgement on AICH is received.

(2) The UE maps the assigned AC to an ASC and n a count value M is set to zero.

(3) The count value M is incremented by one. Next, the UE determines if the count value M representing the number of transmission attempts exceeds the maximum number of permitted RACH transmission attempts Mmax. If so, then the UE treats the transmission as unsuccessful.

(4) However, if M is less than or equal to the maximum number of permitted RACH transmission attempts Mmax, then the UE updates the RACH transmission control parameters. In the next step, a 10 ms timer T2 is set. The UE decides whether to attempt transmission based on the persistence value Pi associated with the ASC selected by the UE. Specifically, a random number Ri is generated between 0 and 1. If the random number Ri is less than or equal to the persistence value Pi, the UE attempts to transmit over an assigned RACH resources, otherwise, the UE waits till the 10 ms timer T2 expires and perform again the procedure in step (4).

(5) When one access attempt is transmitted, the UE determines whether the network responds with an ACKnowledgement (ACK), a Non ACKnowledgment (NACK), or no response. If no response is received from the network, after the timer T2 expires the process is performed again from step (3). If a NACK, indicating a failed receipt of the transmission by the network often due to collision, is received, then the UE waits for the timer T2 to expire then generates a back off value NBO1 randomly chosen between the maximum and minimum back off values NBO1max and NBO1min associated with the PRACH assigned to the UE. The UE then waits a back off interval TBO1 equal to 10 ms times the back off value NBO1 before to perform again the process from step (3). If an ACK, indicating receipt of the UE transmission by the network, is received, then the UE begins the message transmission.

Hereafter, the random access procedure on the physical layer (L1) will be described.

The physical random access procedure is initiated upon request from the MAC sub layer (L2).

Before the physical random-access procedure can be initiated, Layer 1 shall receive the following information from the higher layers (RRC):

The preamble scrambling code.
The message length in time, either 10 or 20 ms.
The AICH_Transmission_Timing parameter [0 or 1].
The set of available signatures and the set of available RACH sub-channels for each Access Service Class (ASC).
The power-ramping factor Power Ramp Step [integer>0].
The parameter Preamble Retrans Max [integer>0].
The initial preamble power Preamble_Initial_Power.
The Power offset P p−m=Pmessage-control Ppreamble, measured in dB, between the power of the last transmitted preamble and the control part of the random-access message.
The set of Transport Format parameters. This includes the power offset between the data part and the control part of the random-access message for each Transport Format.

At each initiation of the physical random access procedure, Layer 1 shall receive the following information from the higher layers (MAC):

The Transport Format to be used for the PRACH message part.
The ASC of the PRACH transmission.
The data to be transmitted (Transport Block Set).

The physical random-access procedure is performed according to the procedures (steps) below:

1. In the random access sub-channel that can be used for the ASC concerned, one access slot is chosen randomly from access slots that can be used in the next full access slot sets2. If there are no access slots available, one access slot is chosen randomly from access slots that can be used in the next full access slot sets.

2. One signature is randomly chosen from the set of available signatures within the given ASC.

3. The preamble retransmission counter is set at Preamble Retrans Max, which is the maximum number of preamble retransmission attempts.

4. The preamble transmission power is set at Preamble Initial Power, which is the initial transmission power of the preamble.

5. The preamble is transmitted on the basis of the chosen uplink access slot, signature and set transmission power.

6. If no ACK or NACK corresponding to the selected signature is detected in the downlink access slot corresponding to the selected uplink access slot.

The next available access slot is selected from the random access sub-channel within the given ASC.
A new signature is randomly selected from the available signatures within the given ASC.
The preamble transmission power is increased by Power Ramp Step, which is the step width of the power ramping.
The preamble retransmission counter is reduced by 1.
The procedures from step 5 are repeated for the duration in which the preamble retransmission counter exceeds 0.
When the retransmission counter reads 0, the higher layer (MAC) is informed of the fact that ACK has not been received on AICH, and the random access control procedures in the physical layer are finished.

7. If NACK corresponding to the selected signature is detected in the downlink access slot concerned, the higher layer (MAC) is informed of the fact that NACK has been received on AICH, and the random access control procedures in the physical layer is finished.

8. The random access message is transmitted 3 or 4 uplink access slots after the uplink access slot of the last transmitted preamble depending on the AICH transmission timing parameter. The transmission power of the control channel of the random access message is set at a level higher than the transmission power of the last preamble transmitted by power offset.

9. The higher layer is informed of the transmission of the random access message, and the random access control procedures in the physical layer are finished.

FIG. 11 shows an exemplary signal flow for Signalling Establishment.

Once the PRACH power control preambles have been acknowledged the RRC Connection Request message can be transmitted (S1101). It contains the reason why the connection is requested.

Depending on the request reason radio network makes decision of kind of resources to reserve and perform synchronization and signaling establishment among radio network nodes (i.e. Node B and serving RNC) (S1102). When the radio network is ready it sends to the UE the Connection Setup message conveying information about radio resource to use (S1103). The UE confirms connection establishment by sending the Connection Setup Complete message (S1104). When the connection has been established, the UE sends an Initial Direct Transfer message that may include various types of information, such as the UE identity, current location, the kind of transaction requested, and the like (S1105). Here, the current location may indicate the PLMN to which the UE requests the signalling connection to be established. An exemplary list of information elements that may be carried by the Initial Direct Transfer message are defined in 3GPP TS 25.331.

Then the UE and network authenticate each other and establish security mode communication (S1106). The actual set up information is delivered through the Call Control Setup message (S1107). It identifies the transaction and indicates the QoS requirements. Upon receiving the message the network starts activities for radio bearer allocation by checking if there are enough resources available to satisfy the requested QoS. If yes, the radio bearer is allocated according to the request. If not, the network may select either to continue allocation with lowered QoS value, or it may select to queue the request until radio resources become available or to reject the call request (S1108, S1109).

The general concept of the present disclosure can be noted as follows: The LTE RACH no longer transmits a payload part, like the related art, including resource request, control signaling, and user data. In the present disclosure, LTE RACH burst is used to indicate terminal presence in a network and contain only preamble part including a signature sequence identifying the random access attempt and possibly implicit information to the network. The preamble part can also be used to establish uplink synchronization with the network. This means that LTE RACH can be used each time the uplink transmission is considered as non-synchronized. Possibly, additional small payload, including terminal identity (if the terminal has been assigned a temporal identity from the system), could be included within RACH transmission.

Contrary to the related art, where the payload part is transmitted within the RACH burst, the remaining payload part is transmitted synchronized uplink transmissions by data non-associated control signaling resources (CSR) and does not differ from other uplink transmission used by synchronized terminals. The main advantage is that the access delay is no longer impacted by the payload part, which in the related art can significantly increase this delay under some radio propagation condition. As the delay decreased, another advantage is availability increase of the RACH resources leading to the access capacity increase.

The details of the present disclosure concept are described hereafter.

A framework for Evolved UTRA (E-UTRA) multiple access techniques has been decided to rely on an orthogonal uplink, where the network scheduler is responsible for rapidly allocating resources among terminals having data for transmission. The uplink should allow for both scheduled (network controlled) transmission and contention based transmission. In case of scheduled based transmission the terminal is dynamically allocated by the network a certain frequency resource for a certain time (i.e. a time/frequency resource). The scheduled transmission is considered to be always synchronized. In case of contention based transmission terminals can transmit without being first scheduled. The contention based transmission can be considered either synchronized (e.g. in response to paging) or non-synchronized (e.g. initial access at power on). Non-synchronised transmission is always contention based and RACH is used to get uplink synchronization. During the random access procedure, the network measures the received signal from terminal, and sends a timing advance (TA) command, which commands the terminal to adjust its uplink transmission timing accordingly. A second RACH transmission may be done to verify the adjusted time offset and possibly help for collision resolution. Once synchronisation is obtained there is a need to maintain time synchronisation in uplink (e.g. in absence of uplink transmission for a longer period). For this either RACH or control signalling resources (CSR) that allow the terminal to maintain time (and possibly frequency) synchronisation can be used. The CSR (Control Signalling Resources) are always considered as synchronized transmission and can be either contention or scheduled based, while RACH is only contention based.

To summarize, the following two cases can be distinguished: (1) Scheduled based uplink transmission always synchronized for: user data, data associated control signalling, and data non-associated control signalling; and (2) Contention based uplink transmission for: RACH, and data non-associated control signalling.

FIG. 12 shows an example of how transmissions may be scheduled with respect to the frequency domain and time domain. The contention based transmissions can be separated from scheduled based transmissions in the time domain by reserving one sub-frame at regular intervals (e.g. for random access transmission). FIG. 12 illustrates the case where one sub-frame per time period is allocated for random access. The value of time period can be signaled to the terminal by the network or can be determined automatically by terminal himself according network specific parameters.

The general proposed procedure and use cases according to the present disclosure are further described below.

FIG. 13 shows an exemplary LTE RACH general proposed procedure. This procedure can be divided into six steps, as indicated in FIG. 13:

(1) When switch-on and after obtaining downlink synchronisation, a terminal first signals its presence on the RACH burst. The RACH burst contain a preamble part with signature sequence identifying the random access attempt and possibly implicit information. In other words, the preamble contains the signature and it is not precluded that the implicit information can be carried by the signature. Namely, each signature may have a specific indication to the network, such as downlink channel quality, resource request or other information. The signature sequences used for the random access burst should have good auto-correlation properties to provide good timing estimation accuracy in the network side, also as low mutual cross-correlation to reduce the interference between users in case of simultaneous random access attempts from multiple terminals. A terminal performing random access randomly selects one signature sequence from a set of available sequences to use in the contention based RACH sub-frame.

(2) As long as the terminal carries out RACH preamble transmissions, this is used by the network to estimate uplink receive timing and thus as a source for the timing-control commands. The network correlates the received signal in the RACH sub-frame with all possible signature sequences. Once it detects a signature sequence(s), given by the highest correlation peak, the timing of the given terminal is known. In response, the network sends a timing adjustment command, and possibly including additional information for instance: RACH resources for next step of random access transmission (e.g. different frequencies/time/code than used previously) terminal temporal identity assigned by the system or/and a CSR assignment for payload part transmission. The network response is linked to the identity of the identified signature sequence in the uplink, thus indicating in response to which random access attempt the downlink control signalling relates.

(3) Once the random access burst has been transmitted, the terminal monitors the appropriate downlink control channel for response from the network. Upon reception of timing adjustment command the terminal then adjusts time offset transmission in accordance with received information. In order to verify the adjusted time offset, the terminal transmits a new random access sequence including the same or specific signature sequence and possibly the payload part including the temporal identity assigned by the system that can help for collision resolution. Collisions may arise if two terminals perform random access procedure in same time with same RACH resources (time/frequency/code signature). If the network receives two signals with similar power level there is collision. It is also possible that the received signals correspond to different power level. The more powerful signal may then completely mask the weaker signal. The network detects the access attempt of one of the terminals and sends a response which can be received by both terminals. The mechanism to help collision resolution by the lower layer rather than the RRC layer, can consist of sending a response linked to the identified signature sequence including temporary identity to use AND a set of RACH resources to use for next random access transmission (set of frequencies and/or time and/or code signature). Thus terminals will be assigned to the same identity, however they will choose randomly the new RACH resources to use among signalled set before to transmit new random access with the assigned identity. When the network receives the same terminal temporary identity in a different RACH resource(s), then it deduce there was collision during previous identity assignment and can resolve this by resending appropriate response to both terminals. The response can be for example to restart the RACH procedure or to continue communication with the new assigned identity for each of them or any other appropriate response. However even such mechanism cannot prevent to avoid the collision completely since there is no guaranty that both terminals can avoid to choose randomly the same resources.

(4) The network sends an appropriate response including information like in step 2 and possibly additional information due to collision resolution. An acknowledgement is sent whether the correct timing advance information was used without collision. Then a terminal is ready to use synchronised transmission.

(5) The uplink synchronised transmission is used to carry:

(5.1) Control signaling: There are two types of control-signaling:

(5.1.1) Data non-associated control-signaling (CSR), can be used in response to downlink transmissions (e.g. paging), scheduling requests for uplink user data transmission. Possibly, additional use can be power control signaling, measurement reporting, channel quality control, handover handling, round trip delay compensation by Timing Advance mechanism (synchronization stand-by). These transmissions can be either scheduled or contention based.

(5.1.2) Data associated control-signaling, which are associated with uplink user data transmission, based only on scheduled transmission.

(5.2) User data: When there is user data to transmit in uplink network schedules the uplink transmission. by assigning one or more resources to the terminals. The resources contain frequency and time allocations (possibly also code resource) to the terminal. They are determined by the network scheduler and may e.g. depend on the channel quality indication reported by the terminal to the network by data associated control-signalling. The network can dynamically or semi-statically control the allocation of resources. The method is based on statistical scheduling. In each TTI (Time Transmission Interval), the terminal determines whether it can transmit or not based on the parameters which have been determined by the network parameters. These parameters can be for example: transmission time validity and time duration before retry.

(6) When the terminal does not have uplink data to transmit for a longer period, the uplink time alignment can be lost. In that case the terminal shall carry out regular uplink transmissions (uplink synchronization signals) with a certain period, to continue to enable uplink receive-timing estimation and thus retain uplink time alignment. This can be performed either by RACH or by appropriate CSR (control signalling resources).

FIG. 14 shows an exemplary LTE RACH USE CASE 1 (Synchronization with Collision resolution).

After the mobile terminal is turned on, downlink (DL) synchronization is performed (S1401). The terminal transmits a random access channel (RACH) preamble (S1402). Upon receipt, the network performs correlation and detection of signatures in the received RACH preamble (S1403). The network transmits a response with respect to the received RACH preamble, the response containing information regarding at least one of a response status, timing advance (TA), temporal identity (Temp ID), and RACH resources set (S1404).

The terminal performs transmission timing advance (TA) adjustment and other adjustments for RACH resources (S1405).

The terminal transmits a RACH payload (S1406) to the network, which then performs verification of adjusted timing advance (TA) and performing collision resolution (S1407). The network then transmits a response containing information regarding at least one of a response status, control signaling resources (CSR), possible new temporal identity (Temp ID), and timing advance (TA) (S1408).

At this point, UL synchronization occurs (S1409). Then, the terminal performs switch on synchronized CSR (S1410). Here, CSR refers to data non-associated Control Signaling Resources. There can be two types of control signaling: data associated control signaling (that is associated with uplink user data transmission) and data non-associated control signaling. Contrary to the UMTS where the payload part is transmitted within the RACH burst, the remaining payload part is transmitted as synchronized uplink transmissions by controlling signaling resources (CSR).

Finally, the terminal transmits control signaling resources (CSR) containing at least one of higher layer messaging, control signaling, and scheduling/resource requests (S1411).

In FIG. 14, the Temp ID (temporal identity) can be either assigned by the system or generated by the terminal.

FIG. 15 shows an exemplary LTE RACH USE CASE 2 (Synchronization without collision resolution at the physical layer, and collision is resolved by a higher layer, such as the RRC layer).

After the mobile terminal is turned on, downlink (DL) synchronization is performed (S1501). The terminal transmits a random access channel (RACH) preamble (S1502). Upon receipt, the network performs correlation and detection of signatures in the received RACH preamble (S1503). The network transmits a response with respect to the received RACH preamble, the response containing information regarding at least one of a response status, timing advance (TA), temporal identity (Temp ID), and RACH resources set (S1504).

At this point, UL synchronization occurs (S1505). Then, the terminal performs switch on synchronized CSR (S1506). Here, CSR refers to data non-associated Control Signaling Resources. There can be two types of control signaling: data associated control signaling (that is associated with uplink user data transmission) and data non-associated control signaling. Contrary to the UMTS where the payload part is transmitted within the RACH burst, the remaining payload part is transmitted as synchronized uplink transmissions by controlling signaling resources (CSR).

Finally, the terminal transmits control signaling resources (CSR) containing at least one of higher layer messaging, control signaling, and scheduling/resource requests (S1507) to allow the network to perform transmission/reception parameters adjustment and collision resolution.

In FIG. 15, possible alternatives are to not transmit Temp ID (either from terminal or network) during the first phase of synchronization, but once uplink synchronization is obtained terminal Id can be transmitted by CSR.

Also, although steps S1502 and S1504 refer to a Temp ID, it should be noted that other parameters (such as scheduling resource request, UE ID, etc.) may be additionally and/or alternatively send and received.

Additionally, the step S1502 of sending (by the terminal) just the preamble or with a payload may be determined based on various factors, such as cell size, detection parameters, etc.

FIG. 16 shows an exemplary LTE RACH USE CASE 3 (Synchronization in absence of user data).

First, it is assumed that no UL data has been transmitted for a relatively long period of time (S1601). Then, the terminal transmits a random access channel (RACH) payload including a terminal ID and a preamble (code signature sequence) (S1602). Thereafter, the terminal receives information regarding timing advance (TA) and other optional information (S1603) or receives appropriate control signaling resources (CSR) (S1604).

In FIG. 16, the use of RACH can be avoided if appropriate CSR are designed by the system to maintain uplink.

FIG. 17 shows an exemplary LTE RACH USE CASE 4 (Response to Network Request).

The terminal receives a paging request from the network (S1701). Then, the terminal transmits a random access channel (RACH) payload including a terminal ID and preamble (S1702). The terminal receives control signaling resources (CSR) assignment and other optional information (S1703). Then, the terminal performs switch on synchronized CSR (S1704). Here, CSR refers to data non-associated Control Signaling Resources. There can be two types of control signaling: data associated control signaling (that is associated with uplink user data transmission) and data non-associated control signaling. Contrary to the UMTS where the payload part is transmitted within the RACH burst, the remaining payload part is transmitted as synchronized uplink transmissions by controlling signaling resources (CSR).

Finally, the terminal transmits a CSR paging response to the network (S1705).

In FIG. 17, the same scheme can be also applied for any request from network. Here, another alternative can be to avoid the use of RACH if appropriate CSR are designed by the system for paging request response (or any request from network).

The features of the present disclosure can be used for the E-UTRA (Evolved UMTS Terrestrial Radio Access) specification of the 3GPP standard. Implementation for various use cases is possible.

Namely, the present disclosure provides a method and procedures for unsynchronized, synchronized and synchronization stand-by communications in EUTRA systems. Various methods and procedure for LTE RACH usage (i.e., LTE RACH use cases) are provided. Various methods and procedure for Data non-associated control signalling resources (CSR) are provided. LTE RACH and Data non-associated control signalling resources (CSR) are used to carry all required information which were carry out only by RACH in previous art (i.e., LTE RACH general procedure). The LTE RACH is considered, as contention based uplink transmission used to indicate presence, collision resolution, to obtain timing and possibly maintain uplink synchronization. When the synchronization is obtained, higher layer message, resource/scheduling request, control signaling (e.g. paging response) and possibly synchronization stand-by are transmitted using a data non associated control signalling resources (CSR) either on contention based or on scheduled based transmission. Also, a method providing a collision resolution mechanism (i.e., general procedure step 3) is possible.

The present disclosure provides a method of processing random access procedures performed by a network, the method comprising: receiving at least one access burst to allow the network to estimate uplink received timing, the access burst containing at least a preamble; and transmitting information for responding to the at least one access burst.

The method may further comprise: allocating resources if at least the preamble of the access burst is received. The resources may be semi-static or dynamic. The method may further comprise: allocating resources to allow the terminal to periodically transmit a signal to maintain synchronization with the network. The resources may be contention resources or scheduled resources. The scheduled resources may be semi-static or dynamic. The preamble may further comprise implicit information. The method may further comprise: transmitting a paging request and allocate resources to allow the terminal to respond to the paging request. The resources may be contention resources or scheduled resources. The scheduled resources may be semi-static or dynamic. The method may further comprise: determining which scheduled resources are to be used for transmitting remaining information. The remaining information may comprise higher layer signaling. The method may further comprise: receiving an additional access burst within different access resources than previous access resources. The information transmitted may contain new random access resources. The access burst may further comprise: an optional payload comprising at least one of a terminal identification or resource request. The receiving step may allow the network to estimate a resource request for a terminal or to identify the terminal. The receiving and transmitting procedures may be used to perform the steps of: receiving a random access channel (RACH) preamble; performing correlation and detection of signatures in the received RACH preamble; and transmitting a response with respect to the received RACH preamble, the response containing information regarding at least one of a response status, timing advance (TA), temporal identity (Temp ID), and RACH resources set. The method may further comprise: receiving a RACH payload; performing verification of adjusted timing advance (TA) and performing collision resolution; transmitting a response containing information regarding at least one of a response status, control signaling resources (CSR), possible new temporal identity (Temp ID), and timing advance (TA); and receiving control signaling resources (CSR) containing at least one of higher layer messaging, control signaling, and scheduling/resource requests. The receiving and transmitting procedures may be used to perform the steps of: receiving a random access channel (RACH) preamble; performing signatures correlation and detection; transmitting information related to at least one of a reception status, timing advance (TA), temporal identity (Temp ID), and control signaling resources (CSR); receiving control signaling resources (CSR); and performing transmission/reception parameters adjustment and collision resolution. The receiving and transmitting procedures may be used to perform the steps of: receiving a random access channel (RACH) payload including a terminal ID and a preamble (code signature sequence) if no uplink data has been transmitted or received for a relatively long period of time; and transmitting information regarding timing advance (TA) and other optional information or sending appropriate control signaling resources (CSR). The receiving and transmitting procedures may be used to perform the steps of: transmitting a paging request; receiving a random access channel (RACH) payload including a terminal ID and preamble; transmitting control signaling resources (CSR) assignment and other optional information; and receiving a CSR paging response.

Also, the present disclosure provides a method of processing random access performed by a mobile terminal, the method comprising: configuring at least one access burst containing at least a preamble; and transmitting the at least one access burst to allow a network to at least estimate uplink received timing.

The preamble may further comprise implicit information. The method may further comprise: receiving parameters for transmitting information not previously transmitted. The method may further comprise: transmitting the same access burst or a new access burst. The new access burst may be to allow the network to synchronize uplink transmission and to resolve network collision. The new access burst may allow the network to verify or adjust an uplink transmission time. The access burst may further comprise: an optional payload comprising at least one of a terminal identification or resource request. The method wherein if transmitting the same access burst or a new access burst, then receiving information for transmitting remaining information to be transmitted on scheduled resources. The method may further comprise: periodically transmitting a signal to maintain synchronization with the network. The resources allocated by the network may be contention resources or scheduled resources. The scheduled resources may be semi-static or dynamic. The method may further comprise: receiving a paging request and the transmitting step is used for responding to the paging request by using allocated resources. The resources may be contention resources or scheduled resources. The scheduled resources may be semi-static or dynamic. The terminal may operate in synchronized, unsynchronized and synchronized stand-by mode. The receiving and transmitting procedures may be used to perform the steps of: transmitting a random access channel (RACH) preamble to allow the network to perform correlation and detection of signatures in the received RACH preamble; and receiving a response with respect to the received RACH preamble, the response containing information regarding at least one of a response status, timing advance (TA), temporal identity (Temp ID), and RACH resources set. The method may further comprise: performing transmission timing advance (TA) adjustment and other adjustments for RACH resources; transmitting a RACH payload to allow the network to perform verification of adjusted timing advance (TA) and performing collision resolution; receiving a response containing information regarding at least one of a response status, control signaling resources (CSR), possible new temporal identity (Temp ID), and timing advance (TA); performing switch on synchronized control signaling resources (CSR); and transmitting control signaling resources (CSR) containing at least one of higher layer messaging, control signaling, and scheduling/resource requests. The transmitting and receiving procedures may be used to perform the steps of: transmitting a random access channel (RACH) preamble to allow the network to perform signatures correlation and detection; receiving information related to at least one of a reception status, timing advance (TA), temporal identity (Temp ID), and control signaling resources (CSR); performing switch on synchronized control signaling resources (CSR); and transmitting control signaling resources (CSR) to allow the network to perform transmission/reception parameters adjustment and collision resolution. The transmitting and receiving procedures may be used to perform the steps of: transmitting a random access channel (RACH) payload including a terminal ID and a preamble (code signature sequence) if no uplink data has been transmitted or received for a relatively long period of time; and receiving information regarding timing advance (TA) and other optional information or receiving appropriate control signaling resources (CSR). The transmitting and receiving procedures may be used to perform the steps of: receiving a paging request; transmitting a random access channel (RACH) payload including a terminal ID and preamble; receiving control signaling resources (CSR) assignment and other optional information; performing switch on synchronized control signaling resources (CSR); and transmitting a CSR paging response.

Certain relative portions of the 3GPP specification, such as 3GPP TS 22.011, 25.321, 25.331 (and their ongoing enhancements and other related sections) are part of the embodiments of the present disclosure and constitute part of the present disclosure by being incorporated herein by reference.

This specification describes various illustrative embodiments of the present disclosure. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the features disclosed herein.

The invention claimed is:

1. A method of processing random access procedures performed by a network, the method comprising:
   receiving a first random access burst including a preamble;
   determining an uplink receive timing in response to receiving the first random access burst;
   transmitting a first response including a timing advance (TA) and a first temporary identification (ID) in response to determining the uplink receive timing;
   receiving a second random access burst including the first temporary identification; and
   transmitting a second response including a control signaling resources (CSR) assignment in response to receiving the second random access burst.

2. The method of claim 1, wherein the preamble is a random access channel (RACH) preamble.

3. The method of claim 2, further comprising:
   correlating and detecting signatures in the RACH preamble.

4. The method of claim 1, wherein the first response further includes at least a response status or random access channel (RACH) resources.

5. The method of claim 1, wherein the second random access burst further includes a random access channel (RACH) payload and an adjusted TA.

6. The method of claim 5, further comprising:
   verifying the adjusted TA; and
   performing collision resolution.

7. The method of claim 1, wherein the second response further includes at least a response status, a second temporary ID, or a second TA.

8. The method of claim 1, further comprising receiving a CSR including at least higher layer messaging, control signaling, or scheduling/resource requests in response to transmitting the second response.

9. The method of claim 1, wherein the first random access burst does not include a payload.

10. A method of processing random access performed by a mobile terminal, the method comprising:
    transmitting a first random access burst including a preamble;
    receiving a first response including a first timing advance (TA) and a first temporary identification (ID) in response to transmitting the first random access burst;
    transmitting a second random access burst including the first temporary identification; and
    receiving a second response including a control signaling resources (CSR) assignment in response to transmitting the second random access burst.

11. The method of claim 10, wherein the preamble further comprises implicit information.

12. The method of claim 10, wherein the preamble is a random access channel (RACH) preamble to allow a network to perform correlation and detection of signatures in the RACH preamble.

13. The method of claim 10, wherein the first response further includes at least a response status, the first temporary ID, or random access channel (RACH) resources.

14. The method of claim 10, further comprising:
    adjusting a transmission TA in response to the received first TA.

15. The method of claim 10, wherein the second random access burst includes a random access channel (RACH) payload to allow the network to perform verification of the adjusted TA and perform collision resolution.

16. The method of claim 15, wherein the second response further includes at least a second temporary ID or a second TA.

17. The method of claim 10, further comprising transmitting a CSR including at least higher layer messaging, control signaling, or scheduling/resource requests in response to receiving the second response.

18. The method of claim 10, wherein the first random access burst does not include a payload.

* * * * *